(12) United States Patent
Osterloh et al.

(10) Patent No.: US 9,742,644 B2
(45) Date of Patent: Aug. 22, 2017

(54) VERIFICATION OF CONNECTION OF METERS TO NETWORK

(71) Applicant: Itron, Inc., Liberty Lake, WA (US)

(72) Inventors: Christopher Lloyd Osterloh, Waseca, MN (US); James Patrick Ogle, Spokane, WA (US); Charles Alan Wartinger, Newman Lake, WA (US); Holger Hildebrandt, Karlsruhe (DE)

(73) Assignee: Itron, Inc., Liberty Lake, WA (US)

( * ) Notice: Subject to any disclaimer, the term of this patent is extended or adjusted under 35 U.S.C. 154(b) by 176 days.

(21) Appl. No.: 14/518,285

(22) Filed: Oct. 20, 2014

(65) Prior Publication Data

US 2015/0036532 A1 Feb. 5, 2015

Related U.S. Application Data

(63) Continuation of application No. PCT/US2013/032483, filed on Mar. 15, 2013.

(30) Foreign Application Priority Data

May 4, 2012 (EP) .................................... 12166879

(51) Int. Cl.
*G01R 31/08* (2006.01)
*H03C 1/62* (2006.01)
(Continued)

(52) U.S. Cl.
CPC ............ *H04L 43/06* (2013.01); *H04L 43/045* (2013.01); *H04L 43/50* (2013.01); *H04L 41/12* (2013.01)

(58) Field of Classification Search
CPC .......... Y04S 20/10; Y04S 20/30; Y04S 20/36; Y04S 20/42; Y04S 20/46; Y04S 20/48;
(Continued)

(56) References Cited

U.S. PATENT DOCUMENTS

| 4,940,976 A | 7/1990 | Gastouniotis et al. |
| 7,242,294 B2 * | 7/2007 | Warrior .............. H04B 7/18506 340/539.11 |

(Continued)

FOREIGN PATENT DOCUMENTS

| EP | 1219124 B1 | 1/2008 |
| WO | WO8906079 A1 | 6/1989 |

OTHER PUBLICATIONS

The European Office Action mailed Jan. 5, 2015 for European patent application No. 12166879.2, a counterpart foreign application of U.S. Appl. No. 14/518,285, 3 pages.

(Continued)

*Primary Examiner* — Hanh N Nguyen
(74) *Attorney, Agent, or Firm* — Lee & Hayes, PLLC

(57) ABSTRACT

To determine network coverage of a device within a network a user may send an instruction to the device using a mobile configuration tool of a mobile device. Upon receiving the instruction, the device of which the network coverage is to be determined may broadcast a message using a standard protocol, and listen to one or more responses from other devices in the network. In response to receiving the one or more responses, the device at issue may relay the one or more responses, or a processing result of the network coverage (determined based on the one or more responses) to the mobile configuration tool for display to the user. The user may determine whether the network coverage of that device meets one or more network coverage criteria and, if not, may take some corrective action.

20 Claims, 5 Drawing Sheets

(51) Int. Cl.
*H04L 12/26* (2006.01)
*H04L 12/24* (2006.01)

(58) Field of Classification Search
CPC ....... Y04S 20/52; H04W 24/08; H04W 24/06; H04W 16/00; H04W 28/00; H04W 64/00; H04W 68/00; H04W 24/10; H04W 40/14; G01D 4/005; H04B 17/27
USPC .............. 370/240–244, 329–331; 455/414.1; 340/870.02, 870.03
See application file for complete search history.

(56) References Cited

U.S. PATENT DOCUMENTS

| | | | | |
|---|---|---|---|---|
| 8,619,609 | B2 * | 12/2013 | Shuey | H04W 40/14 340/870.03 |
| 8,644,804 | B2 * | 2/2014 | Blackwell | G01D 4/002 455/414.1 |
| 8,849,965 | B2 * | 9/2014 | Gonia | H04W 24/06 370/235 |
| 8,880,092 | B1 * | 11/2014 | Cooley | H04B 17/27 340/870.02 |
| 8,886,229 | B2 * | 11/2014 | Nanda | G01D 21/00 370/310.2 |
| 2002/0042268 | A1 | 4/2002 | Cotanis | |
| 2004/0022107 | A1 | 2/2004 | Zaidi et al. | |
| 2005/0192031 | A1 | 9/2005 | Vare | |
| 2005/0239414 | A1 | 10/2005 | Mason et al. | |
| 2007/0013547 | A1 | 1/2007 | Boaz | |
| 2008/0069118 | A1 | 3/2008 | Monier | |
| 2008/0218378 | A1 | 9/2008 | Bakken et al. | |
| 2008/0268816 | A1 | 10/2008 | Wormald | |
| 2010/0113006 | A1 | 5/2010 | Pajjuri et al. | |
| 2010/0188263 | A1 | 7/2010 | Cornwall et al. | |
| 2010/0330943 | A1 | 12/2010 | Hoepfner | |
| 2011/0077037 | A1 | 3/2011 | Osterloh et al. | |
| 2011/0175749 | A1 | 7/2011 | Ellsworth, III | |
| 2011/0280233 | A1 | 11/2011 | Choi et al. | |

OTHER PUBLICATIONS

The European Office Action mailed May 26, 2014 for European patent application No. 12166879.2, 4 pages.
The Extended European Search Report mailed Oct. 5, 2012 for European patent application No. 12166879.2, 7 pages.
The PCT Search Report mailed Jul. 9, 2013 for PCT application No. PCT/US13/32483, 14 pages.

* cited by examiner

NETWORK COVERAGE
ENDPOINT DEVICE ID 12345

| DEVICE ID 23451 | |
| --- | --- |
| 23451 | -61 DBM |
| 23451 | -71 DBM |
| 12567 | -78 DBM |
| 34876 | -255 DBM |
| 56783 | -255 DBM |
| 56783 | -255 DBM |

FIG.4

VERIFICATION OF CONNECTION OF METERS TO NETWORK

RELATED APPLICATION

This application is a continuation of PCT International Application No. PCT/US2013/032483, filed Mar. 15, 2013, which claims foreign priority to European Application No. 12166879.2, filed on May 4, 2012, both of which are incorporated herein by reference.

BACKGROUND

Conventionally, deployment or installation of a new device, such as a smart utility meter, within a network, such as an advanced metering infrastructure (AMI) with automated meter reading, relies on pre-installation modeling (such as propagation modeling) and/or post-installation review (such as performance data review), which usually takes hours, days or even weeks after deployment or installation of the new device to complete. Although these pre-installation modeling and post-installation review processes provide valuable information to ensure successful installation of the new device, these techniques fail to provide a real time feedback or clues about any installation problems (such as network communication problems) of the new device when the installer of the new device is on-site installing the new device. Without this real time feedback, the installer may not be aware of any installation problems associated with the new device until days later. Accordingly, the installer may be forced to later return to the same site where the new device is deployed or installed in order to fix installation problems that, if known at the time of installing the new device, could have been immediately or easily addressed by the installer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4 illustrates an example user interface of a handheld mobile configuration tool displaying a result of network coverage of a device.

DETAILED DESCRIPTION

Overview

As noted above, existing pre-installation modeling and post-installation review fail to provide real-time feedback of any possible installation issues to an installer at the time when he/she deploys a new device.

This disclosure describes a method of determining network coverage of a device within a network when the device is newly installed or is currently being serviced by a personnel (such as a field service representative, for example). The method enables determination of the network coverage of a particular device in real time and provides of real-time feedback to the personnel about any possible network coverage issues of that particular device. This in turn provides an opportunity for the personnel to address the network coverage issues of the particular device at the same site visit and therefore avoids costly return visits of the personnel to the same physical site to fix the issues.

Figure 1:
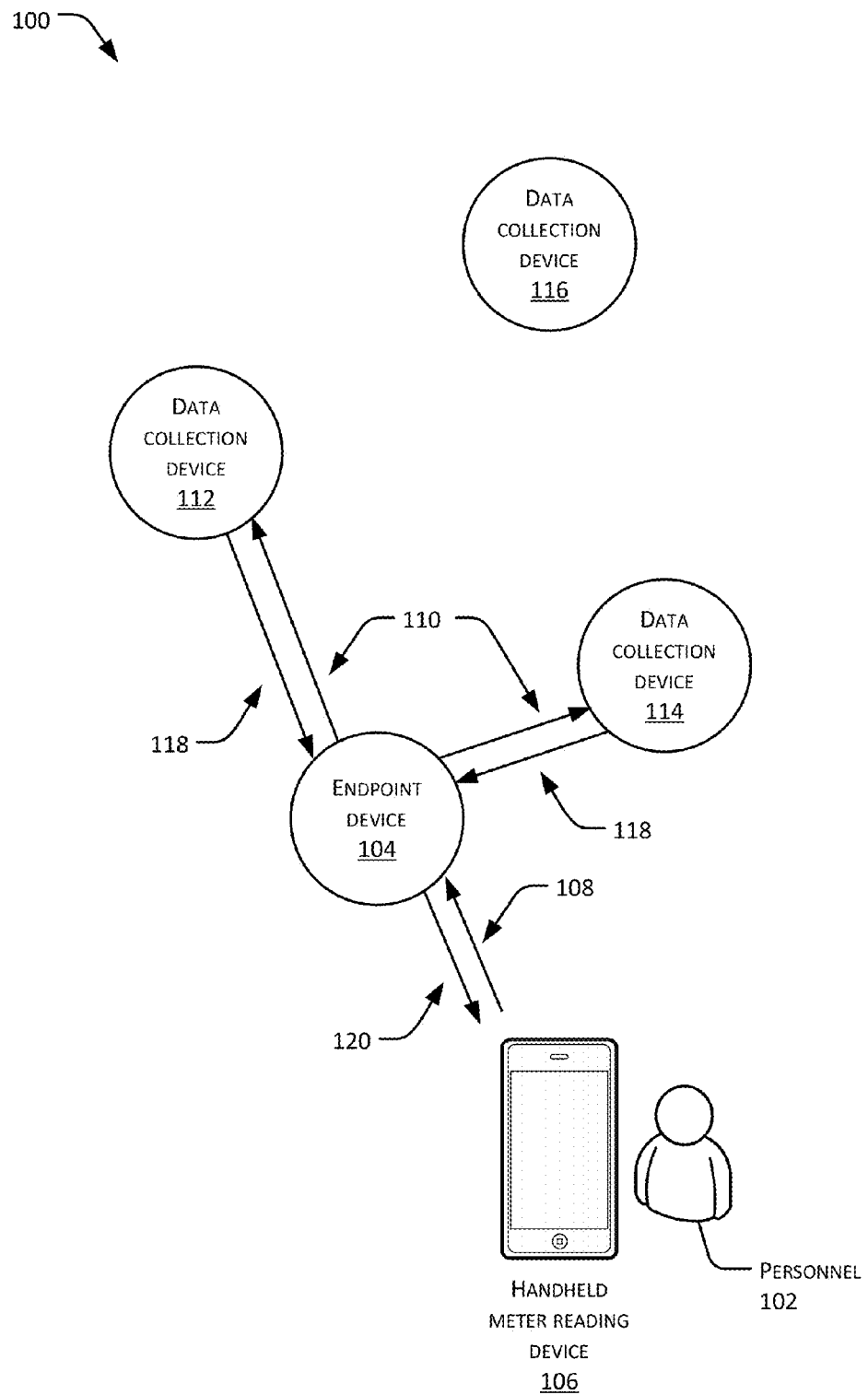
FIG. 1 illustrates an example implementation of determination of network coverage of an endpoint device within a network.

FIG. 1 is a simplified schematic diagram showing an example implementation 100 of determination of network coverage of an endpoint device within a network, such as an advanced metering infrastructure (AMI) network with automated meter reading. Generally, an installer or other personnel 102 responsible for installing and/or servicing devices within the network may want to test an endpoint device 104 within the network. The endpoint device 104 may be a device (such as a smart meter, a sensor, a control point, etc.) that is currently being installed or serviced at a particular location where the personnel 102 is currently located. The personnel 102 may want to make sure that, upon installation or after service, the endpoint device 104 within is able to communication with one or more data collection devices in the network. In one implementation, the personnel 102 may carry a handheld meter reading device 106 that enables the personnel 102 to determine or query the network coverage of the endpoint device 104. For example, the handheld meter reading device 106 may include a mobile configuration tool that allows the personnel 102 to check a network coverage of devices in a neighborhood of the installed endpoint device 104 and/or within the network. The personnel 102 may cause the mobile configuration tool of the handheld meter reading device 106 to send a network coverage instruction 108 to a device (the endpoint device 104 in this example) for which the personnel 102 wants to check network coverage.

In response to receiving the network coverage instruction from the handheld meter reading device 106, the endpoint device 104 may broadcast a network coverage message 110, and listen for one or more responses from other devices (e.g., data collection devices 112, 114, 116, etc., in FIG. 1) in the network. In one implementation, the endpoint device 104 may broadcast the network coverage message 110 using a protocol that complies with standards developed by a national or international standards organization or group, for example. By way of example and not limitation, the standard protocol may include wireless m bus protocol or IEEE 802.11 wireless local area network (LAN) standard. In some implementations, the endpoint device 104 may automatically broadcast a network coverage message 110 on its own, without receiving a network coverage instruction from the handheld meter reading device 106. For example, the endpoint device 104 may broadcast the network coverage message 110 upon installation or boot up. Additionally or alternatively, the endpoint device 104 may broadcast the network coverage message 110 on a regular basis, such as one hour, one day, one week, one month, etc. Additionally or alternatively, the endpoint device 104 may broadcast the network coverage message 110 on its own when detecting that its network coverage has changed, e.g., number of other devices that the endpoint device 104 hears over a period of time has increased or decreased.

In some implementations, the endpoint device 104 may broadcast the network coverage message 110 a predetermined number of times and/or over a predetermined time interval in order to increase the likelihood that the other devices (e.g., the data collection devices 112 and 114) of the network will detect and/or receive the network coverage message and send back one or more responses 118 to the endpoint device 104. In one implementation, the one or more responses may include, for example, information of signal strength received or detected at the data collection devices 112 and 114, identifying information (such as device identifier, network address, etc.) and location information (e.g., GPS (Global Positioning System) data, etc.) of the data collection devices 112 and 114, etc. In some implementations, the one or more responses 118 may be sent to the endpoint device 104 using a received signal strength indicator (RSSI) message according to Institute of Electrical and Electronics Engineers (IEEE) 802.11 protocol.

Upon receiving the one or more responses 118 from the data collection devices 112 and 114 of the network, the endpoint device 104 may send or relay 120 the one or more responses to the handheld meter reading device 106 for display to the personnel 102. The personnel 102 may determine whether the network coverage of the endpoint device 104 satisfies certain criteria including, for example, a minimum number of data collection devices of the network that are able to communicate data (such as the network coverage message in this example) with the endpoint device 104, a minimum threshold signal strength of communication with such data collection device(s), etc. If the network coverage of the endpoint device 104 fails to satisfy the criteria, the handheld meter reading device may prompt the personnel 102 to relocate the endpoint device 104 to another location in order to increase a likelihood of detection or receipt of the data or messages from the endpoint device 104 by data collection devices of the network. Additionally or alternatively, the personnel 102 may take one or more other remedial actions to improve the network coverage of the endpoint device 104, such as installing an auxiliary antenna (e.g., at a more advantages vantage point to receive signals, a directional antenna, etc.), signal amplifier, or the like. Since the personnel 102 is currently on-site, the personnel 102 can try to fix any issues related to network coverage of the endpoint device 104 at the same site visit, thus avoiding unnecessary return visits to fix these problems.

The application describes multiple and varied embodiments and implementations. The following section describes an example environment that is suitable for practicing various implementations. Next, the application describes example systems, devices, and processes for implementing determination of network coverage of a device.

Example Environment

Figure 2:
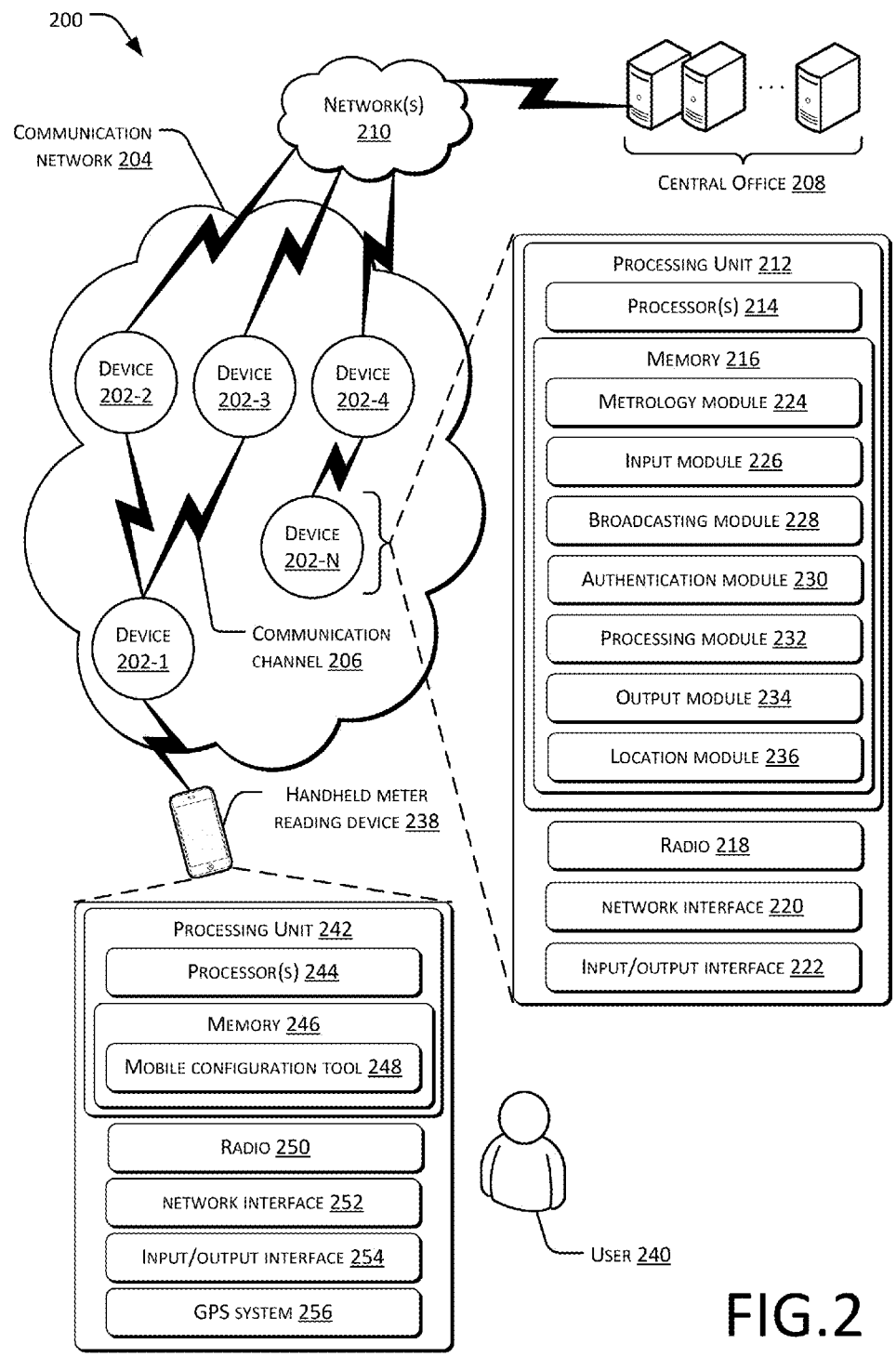
FIG. 2 illustrates an example environment usable to implement determination of network coverage of a device within a network.

FIG. 2 is a schematic diagram of an example environment 200 usable to implement network coverage determination of a device within a network. The environment 200 includes a plurality of network devices or nodes 202-1, 202-2, 202-3, 202-4, . . . , 202-N (collectively referred to as network devices or nodes 202). In one implementation, the plurality of network devices 202 may form a communication network 204. Although FIG. 2 illustrates a single communication network 204 in this example, in some implementations, the plurality of network devices 202 may form more than one communication network 204.

In one implementation, the network devices 202 may be implemented as one of a variety of devices, which include, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, combinations of the foregoing, or any device couplable to one or more of the communication networks 204 and capable of sending and/or receiving data.

In some implementations, the network devices 202 may further be categorized into different types including, but not limited to, endpoint devices (such as metering devices including, for example, smart utility meters, sensors, etc.), data collection devices (such as transformers, servers, relays, root nodes of the communication networks 104, for example), and other types of devices. In this example, the network devices 202-1 and 202-N represent endpoint devices, and the network devices 202-2, 202-3 and 202-4 represent data collection devices, for example.

In one implementation, the endpoint devices may represent devices that directly measure or sense data (e.g., utility consumption data, etc.) at one or more consumption points, such as a consumer's house or business. In some implementations, the data collection devices may include devices that are configured to communicate with one or more endpoint devices and collect data (such as consumption data, for example) from the one or more endpoint devices. In this example, the data collection devices may further be configured to communicate with a central office 208 via a backhaul network(s) 210, such as the Internet.

In one implementation, the communication network 204 may include a wide area network (WAN), metropolitan area network (MAN), local area network (LAN), neighborhood area network (NAN), personal area network (PAN), or the like. While only one communication network 204 is shown in FIG. 2, in some implementations, a larger network, such as an advanced metering infrastructure (AMI) network, may be defined collectively by multiple communication networks 204. At any given time, each individual network device 202 may be a member of a particular communication network 204.

In some implementations, the network devices 202 may communicate with one or more other devices through a wireless communication channel 206. The wireless communication channel may include, for example, a radio frequency (RF) channel over which the network device 202 may be able to transmit or receive data.

In one implementation, the network devices 202 (as represented by the network device 202-N in FIG. 1) may include a processing unit 212. The processing unit 212 may include one or more processor(s) 214 communicatively coupled to memory 216. The memory 216 may be configured to store one or more software and/or firmware modules, which are executable on the processor(s) 214 to implement various functions. While the modules are described herein as being software and/or firmware stored in memory and executable on a processor, in other implementations, any or all of the modules may be implemented in whole or in part by hardware (e.g., as an ASIC, a specialized processing unit, etc.) to execute the described functions.

The memory 216 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

In some implementations, the network device 202 may additionally include a radio 218. The radio 218 comprises a radio frequency (RF) transceiver configured to transmit and/or receive RF signals via one or more of a plurality of channels/frequencies.

Additionally or alternatively, in some implementations, the network device 202 may include a network interface 220, and/or an input/output interface 222. The processing unit 212 may further be configured to receive and process data received from the network interface 220, received from the input/output interface 222, and/or stored in the memory 216.

The network(s) 210, meanwhile, represents a backhaul network, which may itself comprise a wireless or a wired network, or a combination thereof. The network(s) 210 may be a collection of individual networks interconnected with each other and functioning as a single large network (e.g., the Internet or an intranet). Further, the individual networks may be wireless or wired networks, or a combination thereof.

The central office 208 may be implemented by one or more computing devices, such as servers, personal computers, laptop computers, routers, switches, etc. The one or more computing devices may be equipped with one or more processor(s) communicatively coupled to memory. Although the example of FIG. 2 illustrates the central office 208 in a single location, in some examples the central office 208 may be distributed amongst multiple locations and/or may be eliminated entirely (e.g., in the case of a highly decentralized distributed computing platform).

In one implementation, depending on the role, type and/or function of the network device 202, the network device 202 may additionally or alternatively include one or more of other modules including, for example, a metrology module 224, an input module 226, a broadcasting module 228, an authentication module 230, a processing module 232, an output module 234, a location module 236, etc. In one implementation, an endpoint device, such as an endpoint integrated in or associated with a smart meter, may include the metrology module 224 that is configured to collect consumption data of one or more resources (e.g., electricity, water, natural gas, etc.) The collected consumption data may then be transmitted to other devices 202 (such as a data collection device, for example) in the communication network 204 for eventual propagation to the central office 208 or other destination. Details of the functions of these modules will be described hereinafter.

In some implementations, the environment 200 may further include a handheld meter reading device 238 usable by a user 240. The user 240 may be a personnel who is responsible for installing a new device 202 and/or servicing an existing device 202 within the communication network 204. The handheld meter reading device 238 may be implemented as any of a variety of conventional computing devices including, for example, a specialized meter reading device, a notebook or portable computer, a handheld device, a netbook, an Internet appliance, a portable reading device, a tablet or slate computer, a mobile device (e.g., a handheld device, a mobile phone, a personal digital assistant, a smart phone, etc.), etc. or a combination thereof. In one implementation, the handheld meter reading device 238 may include a processing unit 242, which may include one or more processors 244 and memory 246. The memory 246 may include computer-readable media as described above. In one implementation, the handheld meter reading device 238 may include a mobile configuration tool 248. Additionally, in some implementations, the handheld meter reading device 238 may further include a radio 250, a network interface 252 and/or an input/output interface 254. The radio 250, the network interface 252 and/or the input/output interface 254 may enable the handheld meter reading device 238 to communicate data with other devices in the communication network 204, and/or may allow interaction with the user 240.

In one implementation, the mobile configuration tool 248 enables the user 240 to test or query network coverage of a network device 202 within the communication network 204. In some implementations, the network coverage of the network device 202 may include, for example, the number of other devices in the communication network 204 with which the testing device 202 is able to communicate (i.e., is able to send data to and/or receive data from). Additionally or alternatively, the network coverage of the testing device 202 may include the number of a particular type of devices (e.g., data collection devices, etc.) in the communication network 204 that are able to communicate with the network device 202.

Additionally or alternatively, in some implementations, the network coverage of the testing device 202 may include the number of other devices in the communication network 204 that are able to receive data from and/or send data to the testing device at a signal strength level greater than or equal to a predetermined threshold level. The predetermined threshold level may include a default signal strength set by a utility company or a network device manufacturer, a signal strength level set by the personnel (according to corporate policy, for example) or a consumer of the testing device 202. Additionally or alternatively, the predetermined threshold level may be determined based on a signal strength level that is predefined for stable and reliable data communication with other devices in the communication network 204, etc. Additionally or alternatively, in some implementations, the predetermined threshold level may include an upper bound related to radiation level limits mandated by a government agency, for example.

Example Network Coverage Determination

By way of example and not limitation, the user 240 may want to test or determine network coverage of a network device 202 (e.g., the network device 202-1 in this example) within the communication network 204. The device for which network coverage is to be determined is referred to herein as the "testing device." The testing device 202-1 may include a new device that is currently being installed or an existing device that is currently being serviced by the user 240. In one implementation, the testing device 202-1 may include an endpoint device such as a smart meter, a sensor, etc. In other implementations, the testing device 202-1 may include other device types such as a data collection device, for example. Without loss of generality, in this example, an endpoint device is used as an example of the testing device 202-1. Furthermore, the other devices in the communication network 204 that are within transmission range of the testing device 202 are data collection devices, such as the devices 202-2, 202-3 and 202-4, etc.

In some implementations, the user 240 may identify a device for which network coverage is to be determined (i.e., the testing device 202-1 in this example) and provide identifying information (such as a device identifier or a network address, etc.) of the testing device 202-1 to the network configuration tool 248. Additionally or alternatively, in some implementations, the network configuration tool 248 may provide and display to the user 240 information of devices that are available for determination of network coverage (e.g., any endpoints or other network devices in proximity to the handheld meter reading device). By way of example and not limitation, the user 240 may be allowed to select a device type of the device for which the network coverage is to be determined from the mobile configuration tool 248.

Figure 3:
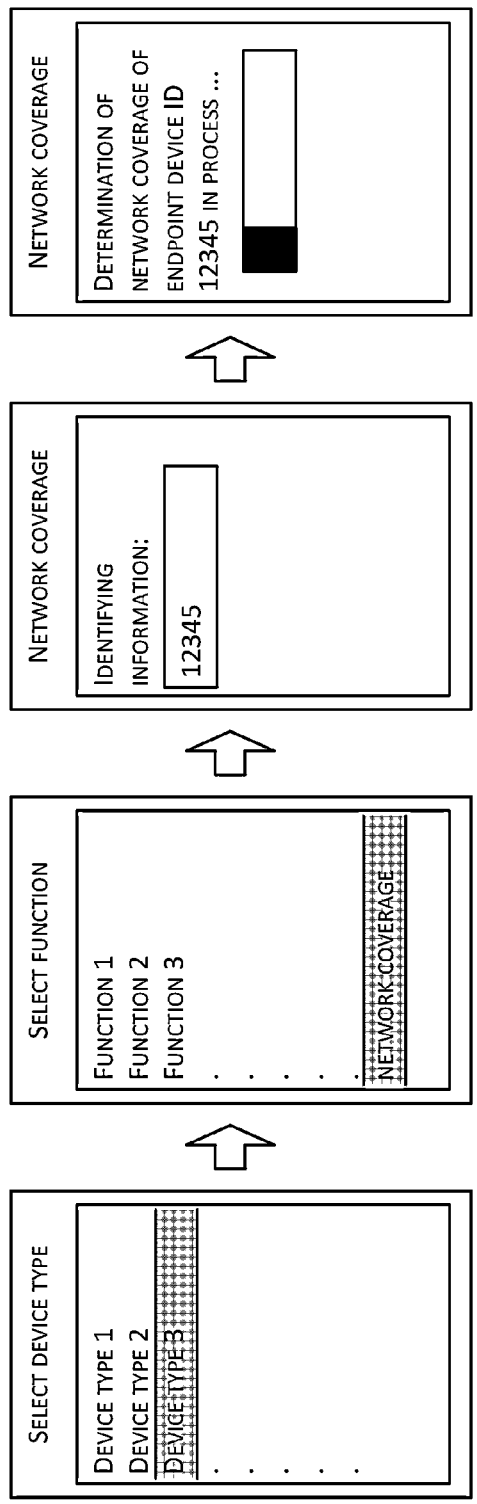
FIG. 3 illustrates an example user interface of a mobile configuration tool enabling identification of a device for determination of network coverage.

FIG. 3 shows an example user interface that enables the user 240 to select the device for which the network coverage is to be determined. In the example of FIG. 3, the user 240 may select a device type of the testing device 202-1 for which the network coverage is to be determined. The user may then select a function from a list of functions provided by the mobile configuration tool 248. The available functions may include, among other things, a network coverage test function. Upon selecting a function of network coverage from the list of functions, the user 240 may provide identifying information, such as a device identifier, of the testing device 201-1 to the mobile configuration tool 248, and prompt the mobile configuration tool 248 to start determination of the network coverage of the testing device 201.

Additionally or alternatively, in one implementation, the network configuration tool 248 may discover any devices in proximity to the handheld meter reading device 238 and may display a user interface that lists all of the devices in proximity to the handheld meter reading 238 device. The user may select a device from the list for which to test the network coverage.

Additionally or alternatively, in one implementation, the network configuration tool 248 may determine the devices that are available for determination of network coverage based on a current location of the user 240 or the handheld meter reading device 238. For example, the handheld meter reading device 238 may include a GPS system 256. The mobile configuration tool 248 may employ the GPS system 256 to determine a current location of the handheld meter reading device 238 and find one or more devices that are located within a predetermined distance from the current location and which should, therefore, be within communication distance of the testing device 202-1.

In some implementations, the network configuration tool 248 may further visually display a map indicating locations of the one or more devices that are located within a predetermined distance from the user 240 (or the current location of the handheld meter reading device 238). The user 240 may select a device from the one or more devices in the map displayed in the network configuration tool of the handheld meter reading device 238 to instruct the selected device to check its network coverage.

Additionally or alternatively, in some implementations, the user 240 may place the handheld meter reading device 238 within a predetermined distance from the device of which the network coverage is to be determined, and send or beam an instruction of determining network coverage to that device through short-range communication such as infrared or Bluetooth communication, for example. In still other examples, the user 240 may physically plug a connection of the handheld meter reading device 238 into a proximate device for which network coverage is to be tested.

In the example of FIG. 3, the user 240 selected a network coverage function provided by the mobile configuration tool 248 to send an instruction to the testing device 202-1. In one implementation, the handheld meter reading device 238 may send the instruction using a standard protocol such as the wireless m bus protocol, or other wireless local area network standard (such as IEEE 802.11 wireless LAN standard, etc.), for example. The instruction may include, for example, a request for the network device 202-1 to determine the network coverage thereof and report a result of the determination back to the handheld meter reading device 238. Additionally, in some implementations, the instruction may further include identifying information (such as a device identifier, a network address if one exist, etc.) of the testing device 202-1. Additionally or alternatively, the instruction may include identifying information and/or authentication information of the handheld meter reading device 238. The identifying information of the handheld meter reading device 238 may include, for example, a device identifier and/or a network address of the handheld meter reading device 238. The authentication information of the handheld meter reading device 238 may include, but is not limited to, a shared or group key or nonce associated with the communication network 204, for example. Additionally, in some implementations, the instruction may further include a particular type of other devices that are included in the determination of the network coverage of the testing device 202-1. For example, the instruction may specify that only data collection devices of the communication network 204 are considered in the determination of the network coverage of the testing device 202-1. For another example, the instruction may indicate that a specific type of devices (e.g., endpoints, transformers, routers, relays, etc.) of the communication network 204 are to be considered in the determination of the network coverage of the testing device 202-1.

Additionally or alternatively, in some implementations, the instruction may include one or more criteria for the network coverage of the testing device 202-1 to be satisfied. By way of example but not limitation, the one or more criteria may include, for example, a minimum number of other devices of the communication network 204 that are able to communicate with the testing device 202-1. Additionally or alternatively, the one or more criteria may include a minimum number of other devices of the number of other devices of the communication network 204 that are able to communicate with the testing device 202-1 at a signal strength level that is greater than or equal to a predetermined signal strength threshold.

Additionally or alternatively, in some implementations, the testing device 202-1 may initiate determination of its network coverage on its own for one or more reasons. For example, after the testing device 202-1 is newly installed and turned on, the testing device 202-1 may start to determine its network coverage within the communication network 204 and return information about its network coverage to the handheld meter reading device 238 for display to the user 240, for example. Additionally or alternatively, the testing device 202-1 may determine its network coverage within the communication network 204 on a regular basis, such as each day, each week, each month, etc.

In one implementation, the testing device 202-1 may receive the instruction sent from the handheld meter reading device 238 through the input module 226. In one implementation, in response to receiving the instruction of network coverage query or test, the testing device 202-1 may broadcast a network coverage message (or installation request) in a neighborhood of the testing device 202-1 through the broadcasting module 228, and listen for one or more responses from other devices of the communication network 204. The broadcasting module 228 may broadcast the network coverage message using the radio 218 and/or through the communication channel 206. The broadcasting module 228 may broadcast the network coverage message using a standard protocol including, for example, the wireless m bus protocol, or other wireless local area network standard, etc. The network coverage message may include a message or request to a device that receives the network coverage message to determine signal strength of the network coverage message that the device receives or detects. Additionally, the network coverage message may include identifying information (such as a device identifier, a network address, etc.) and/or authentication information (such as a shared or group key associated with the communication network 204) of the testing device 202-1. In some implementations, the network coverage message may further include a time or a time period before which a response to the network coverage message is requested to be received. In one implementation, the network coverage message may include a particular type of other devices that are included in the determination of the network coverage of the testing device 202-1. This information of the particular type of other devices may be provided in the instruction of network coverage query received from the mobile configuration tool 248.

In some implementations, prior to broadcasting the network coverage message, the testing device 202-1 may identify and/or authenticate the handheld meter reading device 238. For example, the testing device 202-1 may determine an identity and/or authenticity of the handheld meter reading device 238 using the authentication module 230. The authentication module 230 may determine the identity of the handheld meter reading device 238 using the identifying information of the handheld meter reading device 238 (if included in the instruction of network coverage query or test). Furthermore, the authentication module 230 may determine the authenticity of the handheld meter reading device 238 by determining whether the authentication information (e.g., the shared or group key included in the instruction) is correct. Upon successful identifying and/or authenticating the handheld meter reading device 238, the authentication module 230 may notify the broadcasting module 228 that the handheld meter reading device 238 is successfully identified and/or authenticated, and prompt the broadcasting module 228 to broadcast the network coverage message as instructed in the network coverage query or test. If authentication fails, the authentication module 230 may prompt the testing device 202-1 or the broadcasting module 228 to ignore the instruction.

In one implementation, the testing device 202-1 may broadcast the network coverage message for a predetermined number of times over a predetermined time period or during a predetermined time interval. This increases a likelihood that the network coverage message will be received by one or more devices of the communication network 204 as some devices of the communication network 204 may be busy or inoperative for some duration of time.

Additionally or alternatively, in some implementations, if the testing device 202-1 does not receive responses from any one of the other devices in the communication network 204, the testing device 202-1 may re-broadcast the network coverage message again, for example, for another predetermined number of times over another predetermined time period or between another predetermined time interval. If still no response is received from any other devices (or particular type of devices) of the communication network 204, the testing device 202-1 may report a network coverage failure result to the handheld meter reading device 238 for displaying to the user 240 through the mobile configuration tool 248, for example.

In one implementation, other devices (e.g., the devices 202-2, 202-3, etc.) of the communication network 204 may receive one or more network coverage messages sent from the testing device 202-1 through the input module 226. Upon receiving the one or more network coverage messages, the input module 226 of these receiving devices 202-2 and 202-3, for example, may measure the signal strength of the network coverage messages received from the testing device 202-1, and return one or more responses to the testing device 202-1. In one implementation, the receiving devices 202-2 and 202-3 may return the one or more responses to the testing device 202-1 in a form of a RSSI (i.e., received signal strength indication) message.

In some implementations, prior to measuring the signal strength of a network coverage message and/or returning a response to the testing device 202-1, the receiving device (e.g., the device 202-2) may authenticate the testing device 202-1 based on the authentication information included in the network coverage message using the authentication module 230 of the receiving device. Upon successfully authenticating the testing device 202-1, the receiving device may proceed to measure the signal strength of the network coverage message received, and return a response to the testing device 202-1. If authentication of the testing device 202-1 fails, the receiving device 202-2 may ignore the network coverage message.

Additionally or alternatively, in some implementations, prior to measuring the signal strength of a network coverage message and/or returning a response to the testing device 202-1, the receiving device (e.g., the device 202-2) may determine whether to respond to the network coverage message. For example, the network coverage message may include a particular type of devices (e.g., the data collection devices) from which the testing device 202-1 wants to obtain a response. The receiving device may determine whether it belongs to the particular type of devices specified in the network coverage message. If the receiving device determines that it does not belong to that particular type of devices, the receiving device may ignore the network coverage message, and provide no response to the testing device 202-1. If the receiving device determines that it belongs to that particular type of devices, the receiving device may proceed to perform operations related to the network coverage message.

In one implementation, the receiving device (e.g., the device 202-2) may return a response for each network coverage message received. In some implementations, the receiving device (e.g., the device 202-2) may determine that the received message is a network coverage message, and envision that more than one network coverage message may be received, for example, according to a policy or rule associated with network coverage query or test within the communication network 204. The receiving device may then wait for a predetermined period of time (which may be determined based on the time or time period that may be included in the network coverage message, for example), and receive or collect one or more network coverage messages received from a same device (i.e., the testing device 202-1 in this example). In response to receiving the one or more network coverage messages from the testing device 202-1 within the predetermined period of time, the processing module 232 of the receiving device may obtain an arithmetic average of the received signal strength of the one or more network coverage messages using the processing module 232. The receiving device may then return a single response including the average of the received signal strength of the one or more network coverage messages to the testing device 202-1, at the requested time or within the requested time period (e.g., the earliest time or time period) included in one of the one or more network coverage messages, for example. In other examples, the receiving device may return a single response, which includes signal strength indications for each of multiple received network coverage messages.

Regardless of whether returning a single response for each network coverage message received or one or more network coverage messages received within a predetermine period of time, the receiving devices (e.g., the devices 202-2 and 202-3 in this example) may send respective responses to the testing device 202-1 through their output modules 234. In one implementation, a response to be sent from a receiving device (e.g., the device 202-3) to the testing device 202-1 may include, but is not limited to, information of the signal strength of the network coverage message (or the average for one or more network coverage messages) received at the receiving device. Additionally, in some implementations, the response of the receiving device may further include identifying information (e.g., a device identifier, a network address, etc.) and/or authentication information (e.g., a shared or group key associated with the communication network 204) of the receiving device.

In one implementation, the response of the receiving device may additionally or alternatively include location information (such as GPS data, address, etc.) of the receiving device. For example, the receiving device may determine its current location using the location module 236. In some implementations, the location module 236 of the receiving device may determine a current location of the receiving device based on a GPS system included in the receiving device. Additionally or alternatively, the location module 236 of the receiving device may determine a current location of the receiving device based on location information (such as GPS data, address, etc.) that has been inputted and stored in the memory 116 of the receiving device at the time of installation or firmware or software change, etc.

In response to receiving one or more responses from one or more other devices in the communication network 204, the output module 234 of the testing device 202-1 may relay the one or more responses to the handheld meter reading device 238 for display to the user 240. In some implementations, the testing device 202-1 may first determine the authenticity of these devices from which the one or more responses are received. Upon successful authentication, the testing device 202-1 may proceed to process the one or more responses.

In one implementation, the testing device 202-1 may further measure the signal strength of the one or more responses using the input module 226. The testing device 202-1 may then provide this information of the signal strength of the one or more responses to the handheld meter reading device 238. Additionally or alternatively, in one implementation, the processing module 232 of the testing module 202-1 may average the received signal strength of the network coverage message detected at a receiving device and the measured signal strength of corresponding response from the same receiving device, and return this average to the handheld meter reading device 238.

In some implementations, the testing device 202-1 may process the one or more responses and determine that some responses are received from a same device of the communication network 204. The testing device 202-1 may determine a first arithmetic average of the received signal strength of the network coverage messages reported in the responses using the processing module 232. Additionally or alternatively, the testing device 202-1 may further determine a second arithmetic average of the signal strength of the responses from the same device. Additionally, in some implementations, the testing device 202-1 (or the processing module 232) may further compute a weighted average of the first average and the second average, with weights for the first average and the second average depending on relative importance or frequency of corresponding uni-directional communications. For example, the testing device 202-1 may be an endpoint device, such as a smart meter, which sends data upstream to the communication network 204 more frequently than receiving data downstream from the communication network 204. In this instance, the first average may have a higher weight than the second average. In some implementations, the testing device 202-1 may compute a simple average of the first average and the second average regardless of the relative importance or frequency of corresponding uni-directional communications. Whether to use a simple average or weighted average may be predetermined according to the user 240, a consumer of the testing device 202-1, a policy or rule associated with the communication network 204 or an operator of the communication network 204, for example.

In some implementations, the testing device 202-1 may determine the network coverage thereof based on the one or more responses received. For example, the testing device 202-1 may determine the number of different devices of the communication network 204 from which the one or more responses are received. Additionally, in some implementations, the testing device 202-1 may further compare the received signal strength of the network coverage message detected at these devices of the communication network 204 (and/or the measured signal strength of the one or more responses from these devices) to a predetermined signal strength threshold. The testing device 202-1 may then determine the number of different devices that have corresponding signal strength (of the received network coverage message and/or sent response) greater than or equal to the predetermined signal strength threshold. The predetermined signal strength threshold may be predefined by the user 240 (e.g., through the instruction received by the testing device 202-1), a consumer of the testing device 202-1, a specification related to data communication of the testing device 202-1, a policy or rule associated with the communication network 204 or an operator of the communication network 204 (based on, for example, what type of device the testing device 202-1 is, for example), etc. Furthermore, in some implementations, the predetermined signal strength threshold may be determined based on stability and/or reliability of data communication within the communication network 204 as set forth by the operator or the central office 208.

In one implementation, upon determining the network coverage, the testing device 202-1 may send a result of the network coverage to the handheld meter reading device 238 through the output module 234. Additionally or alternatively, the testing device 202-1 may further include identifying information and/or location information of the devices (e.g., the devices 202-2 and 202-3) that are included in the network coverage of the testing device 202-1 to the handheld meter reading device 238.

In some implementations, the testing device 202-1 may determine whether the determined network coverage satisfies criteria set for the network coverage. The network coverage criteria may be included in the instruction of network coverage query or test from the handheld meter reading device 238. Additionally or alternatively, the network coverage criteria may be predefined according to a policy or rule associated with the communication network 204 or the operator of the communication network 204 based on, for example, what type of device the testing device 202-1 is. In response to determining that the network coverage fails to satisfy the network coverage criteria (e.g., the number of different devices that communicate data with the testing device 202-1 with signal strength greater than or equal to the predetermined signal strength threshold is fewer than that set forth in the criteria), the testing device 202-1 may report a network coverage failure result to the handheld meter reading device 238.

In one implementation, upon determining that the network coverage fails to satisfy the network coverage criterion, the testing device 202-1 may adjust a signal strength or power level associated with data or signal communication, and re-broadcast the network coverage message at an adjusted signal strength level for a predetermined number of times over a predetermined time period or between a predetermined time interval. For example, the signal strength level of data communication for the testing device 202-1 may initially be set at a minimum or certain low level to save energy, for example. The testing device 202-1 may incrementally adjust (or increase) the signal strength level of data communication and re-broadcast the network coverage message until a predetermined upper bounded value is reached. The predetermined upper bounded value may be determined based on a regulation or policy related to radiation as set forth by a government agency, a policy or rule associated with data communication as set forth by the operator of the communication network 204, a predetermined value as given by the consumer of the testing device 202-1, and/or a value as given by the user 240. The testing device 202-1 may stop adjusting or increasing the signal strength level of data communication if/when the network coverage satisfies the network coverage criteria.

Additionally or alternatively, the signal strength level of data communication for the testing device 202-1 may initially be set at a maximum that is allowable by the predetermined upper bounded value. The testing device 202-1 may incrementally adjust (or decrease) the signal strength level of data communication and re-broadcast the network coverage messages (with a sufficient time interval between each pair of different signal strength levels) until the network coverage criterion is minimally attained, for example.

Additionally or alternatively, in some implementations, the testing device 202-1 may automatically use another modulation method that is different and/or more advanced than the modulation method originally used for broadcasting the network coverage message. The testing device 202-1 may re-broadcast the network coverage message using this different and/or more advanced modulation method. For example, the testing device 202-1 may originally broadcast the network coverage message using a FSK (i.e., frequency-shift keying) modulation method. The testing device 202-1 may change to use DSSS (i.e., direct-sequence spread spectrum), OFDM (orthogonal frequency-division multiplexing), or other modulation method to broadcast the network coverage message, and select a modulation method that allows the testing device 202-1 to receive responses from other devices of the communication network 204. In an event that the testing device 202-1 is configured to use more than one modulation method for broadcasting the network coverage message (and/or future messages), the testing device 202-1 may select a modulation method that allows the testing device 202-1 to receive responses from other devices of the communication network 204 while consuming the least power from the testing device 202-1, for example. Additionally or alternatively, the testing device 202-1 may select a modulation method that allows the testing device 202-1 to receive the most number of responses from other devices of the communication network 204.

Additionally or alternatively, in one implementation, the testing device 202-1 may alter a data rate for broadcasting the network coverage message. A lower data rate may enable the network coverage message to reach other devices of the communication network 204 at a larger distance. In an event that the network coverage fails to satisfy the network coverage criteria, the testing device 202-1 may gradually alter or decrease the data rate of broadcasting the network coverage message (and/or future messages) in a predetermined decrement value until, for example, the network coverage (e.g., the number of other devices responding to the testing device, etc.) of the testing device 202-1 satisfies the network coverage criterion set forth for the testing device 202-1. In one implementation, the testing device 202-1 may automatically determine or select the best or optimal operating mode (such as selecting power level or signal strength level to be used, a modulation type or method to be employed, data rate of broadcasting to be used, etc.) for determining the network coverage of the testing device 202-1. In some implementations, the testing device 202-1 may employ this determined operating mode for future data communication with other devices of the communication network 204.

In some implementations, in an event that the network coverage fails to satisfy the network coverage criterion, the testing device 202-1 or the handheld meter reading device 238 may prompt the user 240 to take some corrective action. For example, the testing device 202-1 or the handheld meter reading device 238 may suggest relocating the testing device 202-1, and which direction the testing device 202-1 may be relocated to possibly obtain a better network coverage. The testing device 202-1 may obtain this suggestion based on location information obtained in the one or more responses that are received. Additionally or alternatively, the testing device 202-1 may pre-store location information of some or all of the devices in the communication network 204 or in a vicinity of a scheduled installation. The testing device 202-1 may suggest a direction the testing device 202-1 may be relocated based on this pre-stored location information. For example, the testing device 202-1 may determine that one or more devices (or particular type of devices such as data collection devices, for example) of the communication network are located in a certain physical location, and may suggest to the user 240 through the mobile configuration tool 248, for example, to relocate the testing device 202-1 to that physical location in order to possibly get a better network coverage. In other implementations, instead of suggesting that the testing device 202-1 be relocated, the testing device 202-1 or the handheld meter reading device 238 may suggest taking other corrective action such as adding an auxiliary antenna, a signal amplifier, or the like. Additionally or alternatively, the user 240 may be allowed to adjust one or more parameters for broadcasting the network coverage message (such as power level or signal strength level, modulation type or method, data rate, etc.) through the mobile configuration tool 248, and re-determine the network coverage of the testing device 202-1 using one or more new parameters. Alternatively, before or after sending an initial network coverage message, the mobile configuration tool 248 may prompt the user 240 to adjust one or more parameters for broadcasting the network coverage message (such as power level or signal strength level, modulation type or method, data rate, etc.), and may provide one or more suggested adjustments to the user via the siplay of the handheld meter reading device 238.

In one implementation, the handheld meter reading device 238 may receive a result of the network coverage query or test from the testing device 202-1. The mobile configuration tool 248 of the handheld meter reading device 238 may then display the result to the user 240 on the display of the handheld meter reading device 238. The mobile configuration tool 248 may display the result in a form of a list or a table. The mobile configuration tool 248 may display the result in a descending order of determined signal strength associated with the receiving devices (e.g., the devices 202-2 and 202-3), as shown in FIG. 4.

In some implementations, the mobile configuration tool 248 may additionally or alternatively display the result in a graphical or map format. For example, the received result may include location information of one or more receiving devices that receive the network coverage message of the testing device 202-1 and provide responses to the testing device 202-1. The mobile configuration tool 248 may display respective locations of the one or more receiving devices on a map based on the location information of the one or more receiving devices. In one implementation, the mobile configuration tool 248 may identify the one or more receiving devices on the map using one or more labels or indicators such as icons, dots, etc. In some implementations, the mobile configuration tool 248 may display the map including the one or more labels of the one or more receiving devices. Additionally, in some implementations, the mobile configuration tool 248 may display the received signal strength of the network coverage message detected at the one or more receiving devices (and/or the measured signal strength of the one or more responses and/or the averages of the received signal strength of the network coverage message and the measured signal strength of the one or more responses associated with the one or more receiving devices) on the map using a predetermined coding scheme. By way of example and not limitation, the predetermined coding scheme may include, for example, a color coding scheme (such as different colors for different signal strength), a size coding scheme (e.g., larger sizes for stronger signal strength), etc.

Additionally, in some implementations, the received result may further include location information of one or more other devices (or particular type of devices) that fail to provide responses to the testing device 202-1 but are close to the current location of the testing device 202-1). The mobile configuration tool 248 may further display respective locations of these other devices on the map. Additionally or alternatively, the mobile configuration tool 248 or the handheld meter reading device 238 may pre-store location information of all or some of the devices in the communication network 204 in the memory 246. The mobile configuration tool 248 may display location information of a certain number of devices (or particular type of devices) in a neighborhood of or within a predetermined distance from the testing device 202-1 on the map. The particular type of devices displayable on the map may be selected by the user 240 or determined based on the type of the network coverage (e.g., determining the number of data collection devices that are able to communicate with the testing device 202-1) of the testing device 202-1.

In one implementation, if the network coverage of the testing device 202-1 fails to satisfy the network coverage criteria, the user 240 may determine whether to relocate the testing device 202-1 to another physical location based on the suggestion provided in the result from the testing device 202-1, and/or the location information displayed on the display of the handheld meter reading device 238. Additionally or alternatively, in one implementation, the user 240 may instruct the testing device 202-1 through the mobile configuration tool 248 to adjust (or increase) the signal strength level of data communication (if still less than the predetermined upper bounded value, for example), and re-determine the network coverage. Additionally or alternatively, the user 240 may determined to take one or more other corrective actions to improve the network coverage of the testing device 202-1 (e.g., adding an auxiliary antenna, amplifier, etc.).

Alternative Implementations

Although the foregoing implementations describe the testing device 202-1 to be an endpoint device (such as a smart meter, sensor, control point, etc.) and other devices included in the network coverage of the testing device 202-1 to be data collection devices (such as transformers, routers, etc.), the present disclosure is not limited thereto. In one implementation, the testing device 202-1 may include any existing or newly installed device in the communication network 204 that is able and/or desired (or functioned) to communicate data with other devices in the communication network 204. For example, the testing device 202-1 may be an intermediate device, such as a data collector or aggregator, a router, a server, a relay, a transformer, or any other network device that is configured to communicate with other devices in the network. The user 240 may be interested in determining how many other devices in the communication network 204 can communicate data directly with this intermediate device. If the intermediate device can communicate data directly with only a few other devices in the communication network 204, the user 240 may decide to relocate the intermediate device to a different physical location with the help of the mobile configuration tool as described in the foregoing implementations.

Exemplary Methods

Figure 5:
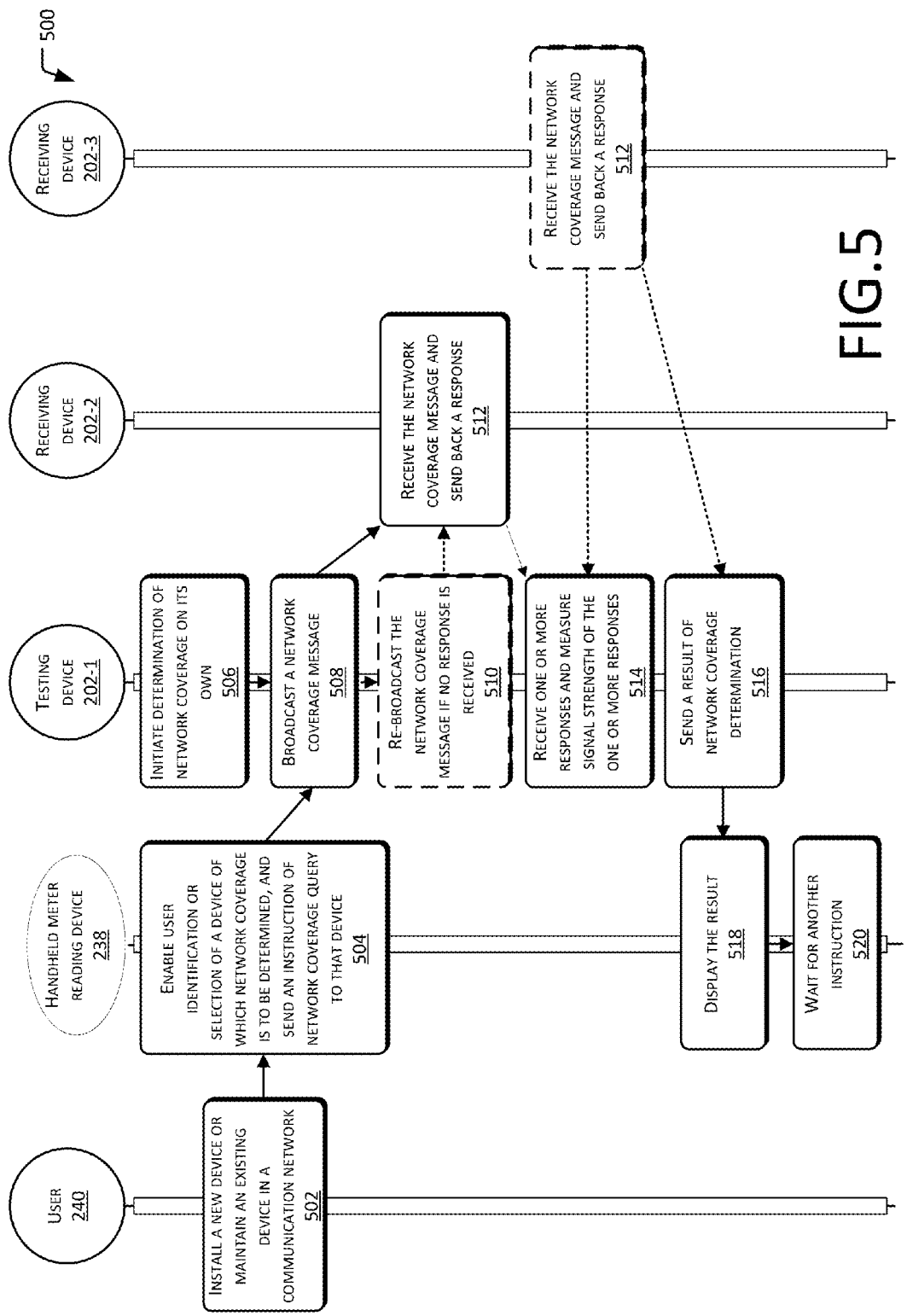
FIG. 5 illustrates an example method of determining network coverage of a device within a network.

FIG. 5 is a flow chart depicting an example method 500 of determining network coverage of a device within a network. The method of FIG. 5 may, but need not, be implemented using the example implementation of FIG. 1, the environment of FIG. 2, and may or may not employ the example user interfaces of FIG. 3 and FIG. 4. For ease of explanation, method 500 is described with reference to FIGS. 1-5. However, the method 500 may alternatively be implemented in other environments and/or using other devices or systems.

Method 500 is described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the method blocks are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Referring back to FIG. 5, at block 502, the user 240 may want to test network coverage of a device (e.g., the testing device 202-1) within the communication network 204. The testing device 202-1 may be a newly installed device or an existing device currently being serviced in the communication network 204. In one implementation, the testing device 202-1 may include an endpoint device such as a smart meter, a sensor, etc. In some implementations, the testing device 202-1 may be an intermediate device, such as a data collector, router, relay, etc.

At block 504, the user 240 may use the network coverage function of the mobile configuration tool 248 provided by the handheld meter reading device 238 to send out an instruction to the testing device 202-1, requesting the testing device 202-1 to determine its network coverage within the communication network 204. In one implementation, the handheld meter reading device 238 may send the instruction using a standard protocol such as a wireless m bus protocol, for example. The instruction may include, but is not limited to, identifying information of the testing device 202-1 of which the network coverage is to be determined.

At block 506, the testing device 202-1 may additionally or alternatively initiate determination of its network coverage on its own for one or more reasons. For example, after the testing device 202-1 is turned on, the testing device 202-1 may start to determine its network coverage within the communication network 204 and return information about its network coverage to the handheld meter reading device 238 for display to the user 240, for example. Additionally or alternatively, the testing device 202-1 may determine its network coverage within the communication network 204 on a regular basis, such as one day, one week, one month, etc.

At block 508, regardless of how the determination of the network coverage is initiated, the testing device 202-1 may broadcast a network coverage message, requesting a receiving device of the network coverage message to determine a signal strength of the received message. The testing device 202-1 then listens for a response to the network coverage message. In one implementation, the testing device 202-1 may broadcast the network coverage message for a predetermined number of times over a predetermined time interval to increase a likelihood that the network coverage message will be received by one or more devices of the communication network 204.

At block 510, the testing device 202-1 may receive no response after a predetermined period of time. If no response is received after the predetermined period of time, the testing device 202-1 may re-broadcast the network coverage message for another predetermined number of times over another predetermined time interval, and wait for receiving one or more responses from other devices of the communication network 204.

At block 512, one or more other devices (such as the devices 202-2 and 202-3, for example) in the communication network 204 may receive the network coverage message from the testing device 202-1. The receiving devices 202-2 and 202-3 may then measure the received signal strength detected at their ends according to the network coverage message. The receiving devices 202-2 and 202-3 may send one or more responses to the testing device 202-1. In one implementation, a response from a receiving device of the communication network 204 may include, for example, received signal strength of the network coverage message that is measured or detected at that device. Additionally, in some implementation, the response from the receiving device may further include identifying information (such as a device identifier, a network address, etc.), and/or location information (such as GPS data associated with the physical location of the receiving device, etc.) of that receiving device, etc. In some implementations, the response may be sent in a form of a RSSI message.

At block 514, in response to receiving the one or more responses from the one or more other devices of the communication network 204, the testing device 202-1 may further measure signal strength of the one or more responses received at the testing device 202-1. In response to measuring the signal strength of the one or more responses, the testing device 202-1 may further combine the received signal strength of the network coverage message detected at a receiving device and the measured signal strength of corresponding response of the same receiving device. In one implementation, the testing device 202-1 may compute an arithmetic average of the received signal strength of the network coverage message detected at the receiving device and the measured signal strength of corresponding response of the receiving device.

At block 516, the testing device 202-1 may return a result of network coverage determination to the handheld meter reading device 238. In one implementation, the result may include, but is not limited to, information of the received signal strength of the network coverage message detected at one or more other devices of the communication network 204, information of the measured signal strength of the one or more responses from the one or more other devices, and/or respective averages of the received signal strength of the network coverage message detected at the one or more devices and the measured signal strength of corresponding responses of the one or more devices, etc. Additionally, in some implementations, the result may further include identifying information and/or location information of these one or more other devices.

At block 518, the handheld meter reading device 238 receives the result of network coverage determination from the testing device 202-1, and displays the result to the user 240 through the mobile configuration tool. The mobile configuration tool 248 may display the result to the user 240 on the display of the handheld meter reading device 238. The mobile configuration tool 248 may display the result in a form of a list or a table. The mobile configuration tool 248 may display the result in a descending order of determined signal strength associated with the one or more other devices of the communication network 204.

In some implementations, the mobile configuration tool 248 may additionally or alternatively display the result in a graphical or map format. For example, the mobile configuration tool 248 may display respective locations of the one or more other devices on a map. Additionally or alternatively, the mobile configuration tool 248 or the handheld meter reading device 238 may pre-store location information of all or some of the devices in the communication network 204 in the memory 146. The mobile configuration tool 248 may display location information of a certain number of devices (or particular type of devices) in a neighborhood of or within a predetermined distance from the testing device 202-1 on the map. The particular type of devices displayable on the map may be selected by the user 240 or determined based on the type of the network coverage (e.g., determining the number of data collection devices that are able to communicate with the testing device 202-1) of the testing device 202-1 being determined.

At block 520, the mobile configuration tool 248 waits for further instruction or request from the user 240. For example, the user 240 may select another device for which network coverage is to be determined. Additionally or alternatively, the user 240 may examine the result of network coverage determination for the testing device 202-1, and determine, from the displayed map or information, whether and/or where the testing device 202-1 may be relocated if the network coverage of the testing device 202-1 fails the network coverage criteria, or if a better coverage for the testing device 202-1 may be obtained.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
under control of a processing unit of a metering device:
broadcasting, from the metering device, a message requesting one or more receiving devices of the message to determine signal strength of the message detected at the one or more receiving devices;
receiving, at the metering device, one or more responses from the one or more receiving devices, the one or more responses comprising information of one or more signal strengths of the message detected at the one or more receiving devices, the information indicating the one or more signal strengths detected at the one or more receiving devices; and
sending, from the metering device, data related to a network coverage of the metering device to a handheld requesting device located at a site of the metering device based at least on the information indicating of the one or more signal strengths of the message detected at the one or more receiving devices.

2. The method as recited in claim 1, wherein the network coverage of the metering device comprises information of a number of receiving devices of the one or more receiving devices that are able to receive data from the metering device at a signal strength level greater than or equal to a predetermined threshold.

3. The method as recited in claim 1, wherein the broadcasting comprises broadcasting the message based on a standard protocol, the standard protocol comprising at least a wireless m bus protocol.

4. The method as recited in claim 1, wherein the one or more responses further comprise identifying information of respective one or more receiving devices.

5. The method as recited in claim 1, further comprising:
measuring, at the metering device, one or more signal strengths of the one or more responses that are received from the one or more receiving devices; and
generating combined signal strength results based on the one or more measured signal strengths of the one or more responses and the information of the one or more signal strengths of the message detected at the one or more receiving devices, wherein the sending comprises sending the combined signal strength results to the hand-held requesting device.

6. The method as recited in claim 1, further comprising, prior to broadcasting the message from the metering device, receiving, at the metering device, a request from the hand-held requesting device instructing the metering device to determine the network coverage of the metering device.

7. The method as recited in claim 1, further comprising:
prior to receiving the one or more responses at the metering device,
receiving no responses with respect to the message at the metering device after a predetermined period of time from the broadcasting; and
re-broadcasting the message from the metering device.

8. The method as recited in claim 1, further comprising:
prior to receiving the one or more responses at the metering device,
receiving no responses with respect to the message at the metering device after a predetermined period of time from the broadcasting; and
outputting a prompt to the hand-held requesting device for relocating the metering device.

9. The method as recited in claim 1, further comprising:
broadcasting, from the metering device, the message a predetermined number of times over a predetermined time interval;
receiving, at the metering device, a plurality of responses to the message from a particular receiving device, each of the plurality of responses comprising information of respective signal strengths of the message detected at the particular receiving device for each of the predetermined number of times;
determining, at the metering device, at least one of a combined value the respective signal strengths or a range of the respective signal strengths detected at the particular receiving device based on the information of the respective signal strengths of the message detected at the particular receiving device for each of the predetermined number of times, the combined value of signal strengths representing a combination of the information of the respective signal strengths of the message detected at the particular receiving device for each of the predetermined number of times; and
sending the at least one of the combined value of signal strengths or the range of signal strengths detected at the particular receiving device to the hand-held requesting device.

10. The method as recited in claim 1, further comprising:
receiving, at the metering device, an instruction from the hand-held requesting device after the sending, the instruction requesting the metering device to re-broadcast the message at a higher signal strength level; and
in response to receiving the instruction, re-broadcasting, from the metering device, the message at the higher signal strength level.

11. The method as recited in claim 1, wherein the one or more receiving devices comprises a data collector device responsible for collecting and/or relaying a meter reading received from the metering device, and wherein the hand-held requesting device is usable by a user to determine the network coverage of the metering device in one or more physical locations and to facilitate installation of the metering device in a physical location that satisfies a minimum threshold of a number of data collector devices that are able to receive data from the metering device.

12. The method of claim 1, further comprising causing a prompt to be presented on a display associated with the hand-held requesting device prompting a user of the hand-held requesting device to perform at least one of:
changing a location of the metering device based on the data related to the network coverage of the metering device; or
installing at least one of an antenna or a signal amplifier with the metering device.

13. A system comprising:
a processing unit, of a hand-held requesting device, configured to perform acts comprising:
receiving, from a user and by an input interface of the hand-held requesting device located at a site of a metering device, an instruction to query the metering device for network coverage information for a network which includes the metering device;
sending, by a network interface of the hand-held requesting device, a request for the network coverage information to the metering device based at least in part on the instruction to query the metering device, the request prompting the metering device to broadcast a network coverage message and listen for responses from one or more other devices in the network, wherein the network coverage message prompts a receiving device that receives the network coverage message to determine a signal strength of the network coverage message received at the receiving device; and
receiving, by the network interface of the hand-held requesting device, a reply from the metering device, the reply comprising information of one or more other devices in the network that receive the network coverage message and provide one or more responses to the metering device, wherein the one or more responses comprises at least one of a signal strength of the network coverage message detected at the one or more other devices, identifying information of the one or more other devices, or location information of the one or more other devices.

14. The system as recited in claim 13, the acts further comprising displaying, by an output interface of the hand-held requesting device, information of a plurality of devices that are located within a predetermined distance from the metering device, each of the plurality of devices being configured to determine the network coverage information for the network in response to receiving the request from the user, and wherein receiving the instruction to query the metering device comprises receiving a selection of one of the plurality of devices from the user.

15. The system as recited in claim 13, the acts further comprising:
mapping one or more locations of the one or more other devices on a map based on the location information of the one or more other devices;
associating one or more labels with the one or more other devices at the one or more mapped locations on the map; and
displaying, by an output interface of the hand-held requesting device, the map comprising the one or more labels associated with the one or more other devices.

16. One or more computer-readable media storing computer-executable instructions that, when executed by one or more processors, configure the one or more processors to perform operations comprising:
broadcasting, from a metering device, a message to one or more receiving devices, the message comprising a request for the one or more receiving devices to determine a signal strength of the message detected at the one or more receiving devices;
receiving, at the metering device, one or more responses from the one or more receiving devices, the one or more responses comprising information of one or more signal strengths of the message detected at the one or more receiving devices, the information indicating the one or more signal strengths detected at the one or more receiving devices; and
sending, from the metering device and to a hand-held requesting device located at a site of the metering device, data including the indication of the one or more signal strengths of the message detected at the one or more receiving devices.

17. The one or more computer-readable media of claim 16, wherein the hand-held requesting device comprises a mobile wireless meter reading device;
the operations further comprising causing a prompt to be presented on a display associated with the mobile wireless meter reading device prompting a user to perform at least one of:
changing a location of the metering device based on the data including the indication of the one or more signal strengths; or
installing at least one of an antenna or a signal amplifier with the metering device.

18. The one or more computer-readable media of claim 16, wherein the broadcasting comprises broadcasting the message based on a standard protocol, the standard protocol comprising at least a wireless m bus protocol.

19. The one or more computer-readable media of claim 16, the operations further comprising:
measuring, at the metering device, one or more signal strengths of the one or more responses that are received from the one or more receiving devices; and
generating combined signal strength results based on the one or more measured signal strengths of the one or more responses and the information indicating the one or more signal strengths detected at the one or more receiving devices, wherein the sending comprises sending the generated signal strength results to the hand-held requesting device.

20. The one or more computer-readable media of claim 16, wherein the information further indicates identifying information of the one or more receiving devices, and authentication information of the one or more receiving devices.

* * * * *